UNITED STATES PATENT OFFICE.

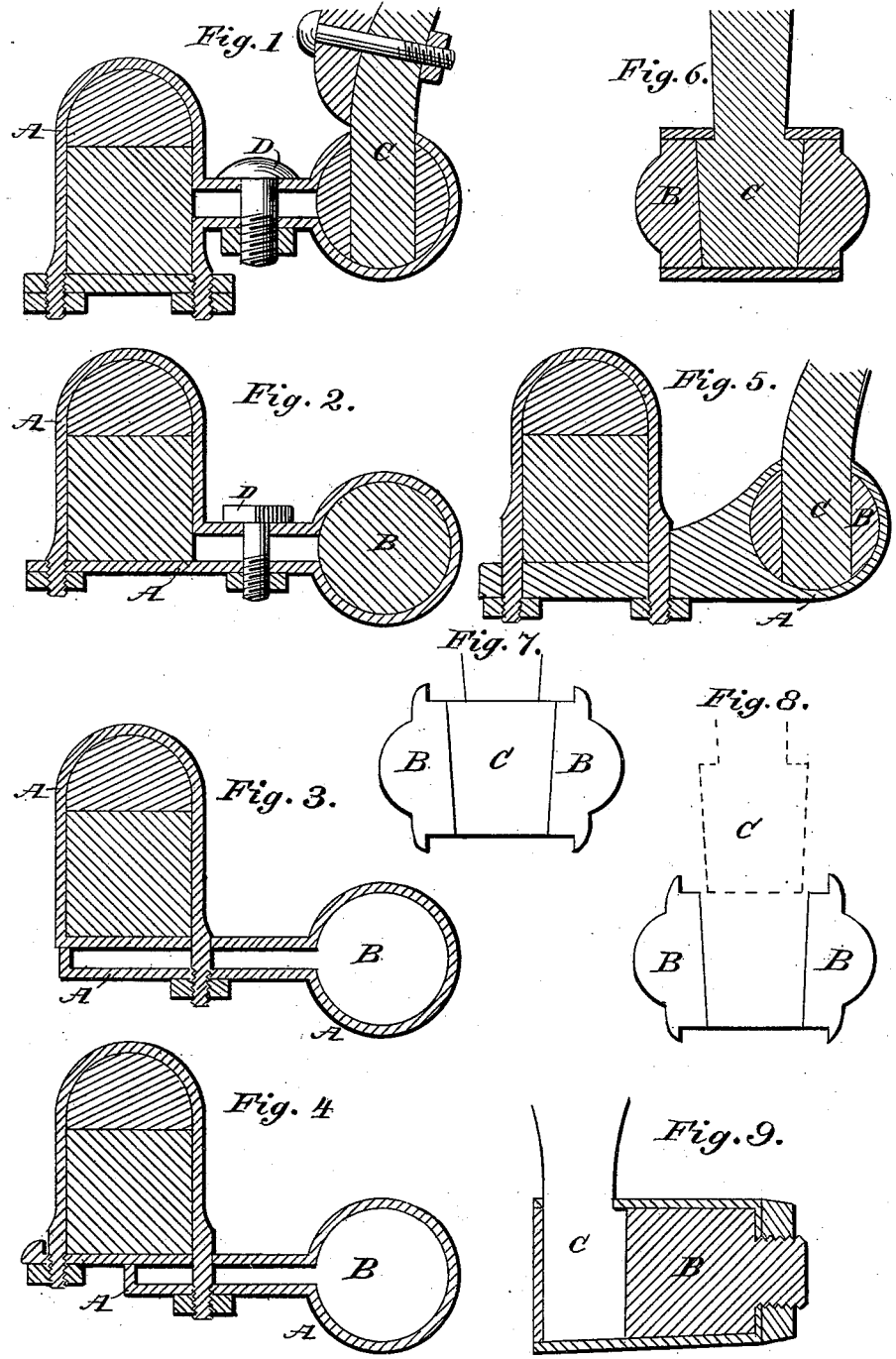

FERDINAND W. STARR, OF GRAND LEDGE, MICHIGAN.

THILL AND POLE COUPLING.

SPECIFICATION forming part of Letters Patent No. 251,385, dated December 27, 1881.

Application filed March 21, 1881. (Model.)

*To all whom it may concern:*

Be it known that I, FERDINAND WM. STARR, a citizen of the United States, residing at Grand Ledge, in the county of Eaton and State of Michigan, have invented a new and useful Improvement in Thill and Pole Couplings, of which the following is a specification, reference being herein had to the accompanying drawings, in which like letters of reference indicate like parts.

Figure 1 is a vertical section, showing the essential features of the coupling. Figs. 2, 3, 4, and 5 represent modifications of the same; and Figs. 6, 7, and 8 show separate views of socketed cylinder B and shaft-iron C.

The objects of these improvements are, first, to provide an enlarged area of wearing-surface in thill and pole couplings, in consequence of which speedy destruction of the wearing parts is obviated; second, simple means by which any wear may be taken up and rattling prevented; and, third, convenience for coupling and uncoupling. I attain these objects by the construction shown in Fig. 1, in which—

A is an expanding clip, open at its ends and side, and so shaped as to embrace the socketed or mortised cylinder B, and branching off at its open side to form the axle-clip or yoke, or both, as may be desired.

B is a cylinder having a mortise or socket for the reception of the thill-iron head C. This cylinder is journaled within the expanding clip A, as is shown in the drawings.

C is the thill or pole iron, having shoulders, by which it is held within the socket or mortise of cylinder B by means of suitable abutments provided on the expanding clip or cylinder B, said shoulders and abutments being for the purpose simply to prevent disengagement of the coupling when in position for use, and not, as is usual in such thill-irons, for the purpose of sustaining the draft in drawing the vehicle, my intention being, as shown in drawings, to have the thill-iron end which enters the mortise in cylinder B nearly vertical, so that the shoulders of thill-iron head and abutments for the same may, as much as possible, be relieved from the force in drawing the vehicle, and to bring nearly all the wear incident in use upon the enlarged area of wearing-surface in the expanding clip A and journaled cylinder B.

D is a bolt, screw, or rivet, by the use of which any wear may be readily taken up, the cylinder B snugly held in its bearing, and also helps to strengthen the coupling.

In the model accompanying I do not show any flanges or grooves on the cylinder B by which it may be held from lateral motion in its bearing, thinking that the merits of the device could be more readily perceived by leaving off the same. Also, the thill-iron may be attached to the cylinder B at the side of expanding clip A by letting the cylinder B project out from its bearing in the expanding clip A sufficiently far to admit of the connection of the thills to the same. Provision for the insertion of thill-iron end into its socket provided in cylinder B may be made at other points from that shown without deviating from the spirit of my invention.

Having thus described my invention, what I claim as new, and desire to secure by Letters Patent, is—

1. In a thill and pole coupling, the expanding clip A and the clasping-cylinder B, branching off in one continuous piece to form the axle-clip or yoke, or both, in combination with the bolt D, passing through branches of the expanding clip, substantially as specified.

2. In a thill and pole coupling, the combination of the expanding clip A, the clasping and socketed cylinder B, forming bearings for the clip, the thill-iron C, having its seat in the socketed cylinder, and the adjusting-bolt D, substantially as specified.

3. The herein-described thill and pole coupling, consisting of the expanding clip A, the clasping and socketed cylinder B, the thill-iron C, and the adjusting-bolt D, all constructed, arranged, and operating substantially as shown and described, for the purpose set forth.

FERDINAND WM. STARR.

Witnesses:
GEORGE B. BROWN,
JOHN W. SEDORE.